(12) United States Patent
Kaufman et al.

(10) Patent No.: US 12,346,267 B2
(45) Date of Patent: Jul. 1, 2025

(54) SYSTEMS AND METHODS OF SUPPORTING DEDUPLICATION AND COMPRESSION OF ENCRYPTED STORAGE VOLUMES

(71) Applicant: Dell Products L.P., Round Rock, TX (US)

(72) Inventors: Charles W. Kaufman, Redmond, WA (US); Xuan Tang, Hopkinton, MA (US); George Papadopoulos, Franklin, MA (US); Vasu Subramanian, Chapel Hill, NC (US); Jamie Pocas, Milford, MA (US); Naizhong Chiu, Newton, MA (US); Gregory W. Lazar, Upton, MA (US)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 17/942,410

(22) Filed: Sep. 12, 2022

(65) Prior Publication Data
US 2024/0086335 A1    Mar. 14, 2024

(51) Int. Cl.
| | | |
|---|---|---|
| *G06F 12/14* | (2006.01) | |
| *G06F 9/455* | (2018.01) | |
| *G06F 21/60* | (2013.01) | |
| *H04L 9/08* | (2006.01) | |

(52) U.S. Cl.
CPC ...... *G06F 12/1408* (2013.01); *G06F 9/45558* (2013.01); *G06F 21/602* (2013.01); *H04L 9/0822* (2013.01); *G06F 2009/45583* (2013.01); *G06F 2212/1052* (2013.01)

(58) Field of Classification Search
CPC ............... H04L 9/0822; G06F 12/1408; G06F 9/45558; G06F 21/602; G06F 2009/45583; G06F 2212/1052
See application file for complete search history.

(56) References Cited

U.S. PATENT DOCUMENTS

| | | | |
|---|---|---|---|
| 9,735,962 B1 * | 8/2017 | Yang | H04L 9/0877 |
| 9,917,854 B2 | 3/2018 | Natanzon et al. | |
| 10,615,969 B1 * | 4/2020 | Griffin | H04L 9/0897 |
| 10,680,813 B2 | 6/2020 | Kaufman | |
| 10,969,989 B2 | 4/2021 | Tylik et al. | |
| 11,128,460 B2 | 9/2021 | Perlman et al. | |

(Continued)

*Primary Examiner* — Oleg Survillo
(74) *Attorney, Agent, or Firm* — BainwoodHuang (57) ABSTRACT

Techniques for providing increased support for deduplication and compression of encrypted storage volumes. The techniques include receiving, at a storage virtual machine (VM), a data encryption key (DEK) associated with encrypted volume data, in which the DEK is wrapped in a key encryption key (KEK). The techniques include receiving, at the storage VM from a client virtual machine (VM), a write request specifying the encrypted volume data. The techniques include obtaining, by the storage VM, the KEK from a key management system (KMS) embedded on the storage VM. The techniques include unwrapping, by the storage VM, the DEK using the KEK, and decrypting, by an IO decryptor hosted by the storage VM, the encrypted volume data using the DEK. The techniques include performing, by the storage VM, data reduction operations on the decrypted volume data, and storing, by the storage VM, the data-reduced volume data on a storage array.

19 Claims, 3 Drawing Sheets

(56) References Cited

U.S. PATENT DOCUMENTS

| | | | |
|---|---|---|---|
| 11,163,459 B2 | 11/2021 | Chiu et al. | |
| 11,683,159 B2 * | 6/2023 | Lidzborski | G06F 21/30 713/159 |
| 12,160,525 B2 * | 12/2024 | Wang | H04L 9/3257 |
| 2016/0057466 A1 * | 2/2016 | Kumar | H04N 21/4405 725/25 |
| 2020/0145395 A1 * | 5/2020 | Kanungo | H04L 9/0841 |
| 2020/0195433 A1 * | 6/2020 | Collier | G06F 21/602 |
| 2022/0239471 A1 * | 7/2022 | Perlman | H04L 9/088 |
| 2022/0253389 A1 * | 8/2022 | Fay | H04L 9/50 |
| 2023/0004315 A1 * | 1/2023 | Nagle | H04L 9/0894 |
| 2023/0283465 A1 * | 9/2023 | Bathula | H04L 9/0894 713/164 |
| 2023/0297411 A1 * | 9/2023 | Tsirkin | G06F 12/10 718/1 |
| 2023/0401163 A1 * | 12/2023 | Irwin | G06F 3/067 |
| 2024/0089097 A1 * | 3/2024 | Sugahara | H04L 9/14 |

\* cited by examiner

SYSTEMS AND METHODS OF SUPPORTING DEDUPLICATION AND COMPRESSION OF ENCRYPTED STORAGE VOLUMES

BACKGROUND

Storage systems include storage processing circuitry and arrays of storage devices such as hard disk devices (HDDs) and solid-state devices (SSDs). The storage processing circuitry service storage input/output (IO) requests issued by storage client computers ("storage client(s)") communicably coupled to the storage systems. The storage IO requests (e.g., read requests, write requests) specify blocks, pages, files, or other storage elements containing data or metadata to be read from or written to volumes, virtual volumes, logical units, filesystems, or other storage objects maintained on the storage devices. The data or metadata ("volume data") can exist as "data-at-rest" where the volume data is persistently stored, for example, in magnetic or flash memory or on HDDs or SDDs, or "data-in-flight" where the volume data is temporarily stored in computer memory and/or transmitted over a network to a storage system for non-volatile storage. For increased data security, volume data existing as data-at-rest or data-in-flight can be encrypted by a storage client. Such client-based data encryption involves converting volume data to an encrypted form called "ciphertext," which cannot be deciphered, discerned, or otherwise understood unless the correct secret key is used to decrypt it.

SUMMARY

Unfortunately, implementing client-based data encryption in storage environments can be problematic for various reasons. For example, a storage system may be configured to perform data reduction operations such as data deduplication and data compression to reduce the amount of non-volatile storage needed for storing volume data, thereby reducing the cost per unit of storage. Data deduplication can include comparing digests (or hash values) of blocks or portions ("chunks") thereof in the volume data to identify any redundant or duplicate blocks or chunks, storing a single instance of each redundant or duplicate block or chunk in non-volatile storage, and using a pointer or reference to access the single stored instance. When data compression is performed in combination with data deduplication, the resulting size of each single instance stored in non-volatile storage can be less than that of a block or chunk, e.g., less than 4 kilobytes (KB). However, client-based data encryption can make it difficult for a storage system to perform comparisons needed for data deduplication. Indeed, while it may be possible for a storage system to encrypt deduplicated data, it may be difficult if not impossible for the storage system to deduplicate encrypted data. Moreover, a storage client may wish to perform rekeying operations to change one or more cryptographic or encryption keys used to encrypt its data-at-rest. However, some storage systems may be incapable of accommodating such data-at-rest rekeying due to certain software and/or hardware limitations. As a result, the storage client may be required to (i) read all of its encrypted volume data from non-volatile storage of a storage system, (ii) decrypt the volume data using an original encryption key, (iii) re-encrypt the volume data using a new encryption key, and (iv) write the re-encrypted volume data back to non-volatile storage of the storage system, which can be a costly process in terms of processing and/or memory resources.

Techniques are disclosed herein for providing increased support for deduplication and compression of encrypted storage volumes. In the disclosed techniques, data or metadata ("volume data") encrypted at a storage client can be decrypted at a storage system to allow data reduction operations (e.g., data deduplication operations, data compression operations), among others, to be performed on the volume data. In a storage environment having a virtualized infrastructure, each of the storage client and the storage system can be implemented as a virtual machine (VM). The storage client ("client VM") can be associated with a hypervisor that includes an IO encryptor. The storage system ("storage VM") can be associated with a hypervisor and can include an IO decryptor and an embedded key management system (KMS) providing functionality of a key encryption key (KEK) server. The disclosed techniques can include receiving, at the storage VM from the client VM, a data encryption key (DEK) associated with encrypted volume data, in which the DEK is wrapped in a key encryption key (KEK). The disclosed techniques can further include receiving, at the storage VM from the client VM, a write request specifying the encrypted volume data for storage on a storage array. The disclosed techniques can further include obtaining, by the storage VM, the KEK from the embedded KMS (e.g., the KEK server), and unwrapping, by the storage VM, the DEK using the KEK. The disclosed techniques can further include decrypting, by the IO decryptor of the storage VM, the encrypted volume data using the DEK. The disclosed techniques can further include performing, by the storage VM, one or more data reduction operations on the decrypted volume data and storing the data-reduced volume data on the storage array.

In certain embodiments, a method of providing increased support for deduplication and compression of encrypted storage volumes includes receiving, at a storage system, an encrypted data encryption key (DEK) associated with encrypted volume data, in response to a write request specifying the encrypted volume data from a storage client, obtaining, by the storage system, a key encryption key (KEK) associated with the encrypted DEK from a key management system (KMS) embedded on the storage system, decrypting, by the storage system, the encrypted DEK using the KEK, decrypting, by the storage system, the encrypted volume data using the DEK, performing, by the storage system, one or more data reduction operations on the decrypted volume data, and having performed the data reduction operations, storing, by the storage system, the volume data on a storage array.

In certain arrangements, the method includes, in response to a read request specifying the volume data from the storage client, reading, by the storage system, the volume data from the storage array, reconstructing, by the storage system, the volume data, encrypting, by the storage system, the volume data using the DEK, and transmitting, by the storage system, the encrypted volume data to the storage client.

In certain arrangements, the method includes receiving the DEK in response to a volume being mounted at the storage client.

In certain arrangements, the received DEK is wrapped in the KEK, and the method includes unwrapping, by the storage system, the DEK using the KEK obtained from the KMS.

In certain arrangements, the method includes receiving, at the storage system, a request for the KEK from a virtualization manager.

In certain arrangements, the request for the KEK includes an identifier (ID) for the KEK, and the method includes obtaining the KEK corresponding to the ID from the KMS.

In certain arrangements, the method includes providing the KEK to the virtualization manager, the virtualization manager sharing the KEK with the storage client.

In certain arrangements, the method includes obtaining a KEK from a KMS external to the storage system.

In certain arrangements, the method includes receiving, at the storage system from the storage client, a second (DEK) different from the received DEK associated with the encrypted volume data, and receiving, at the storage system from the storage client, a directive to encrypt or decrypt volume data-in-flight, as appropriate, using the second DEK when servicing any future read requests or write requests from the storage client.

In certain arrangements, the method includes, in response to a read request specifying the volume data from the storage client, reading, by the storage system, the volume data from the storage array, reconstructing, by the storage system, the volume data, encrypting, by the storage system, the volume data using the second DEK, and transmitting, by the storage system, the encrypted volume data to the storage client.

In certain embodiments, a system for providing increased support for deduplication and compression of encrypted storage volumes includes an embedded key management system (KMS), a memory, and processing circuitry configured to execute program instructions out of the memory to receive an encrypted data encryption key (DEK) associated with encrypted volume data, receive a write request specifying the encrypted volume data from a storage client, obtain a key encryption key (KEK) associated with the encrypted DEK from the KMS embedded on the system, decrypt the encrypted DEK using the KEK, decrypt the encrypted volume data using the DEK, perform one or more data reduction operations on the decrypted volume data, and having performed the data reduction operations, store the volume data on a storage array.

In certain arrangements, the processing circuitry is further configured to execute the program instructions out of the memory to receive the DEK in response to a volume being mounted at the storage client.

In certain arrangements, the processing circuitry is further configured to execute the program instructions out of the memory to obtain a KEK from an external KMS.

In certain arrangements, the storage client includes a hypervisor associated with a virtual machine, and the hypervisor includes a virtual machine file system (VMFS).

In certain arrangements, a plurality of individual volumes are encoded as files within a VMFS volume of the VMFS, the volume data corresponds to a data block having an offset in an individual volume from among the plurality of individual volumes, and the write request specifying the encrypted volume data includes metadata containing the offset of the data block in the individual volume.

In certain arrangements, the processing circuitry is further configured to execute the program instructions out of the memory to decrypt the encrypted volume data using the DEK and the offset of the data block in the individual volume.

In certain arrangements, the system includes a key decryptor configured to decrypt the encrypted DEK using the KEK and a data decryptor configured to decrypt the encrypted volume data using the DEK, and at least one of the key decryptor, the data decryptor, and the KMS is encapsulated in a secure enclave.

In certain embodiments, a computer program product including a set of non-transitory, computer-readable media having instructions that, when executed by processing circuitry, cause the processing circuitry to perform a method including receiving, at a storage system, an encrypted data encryption key (DEK) associated with encrypted volume data, in response to a write request specifying the encrypted volume data from a storage client, obtaining, by the storage system, a key encryption key (KEK) associated with the encrypted DEK from a key management system (KMS) embedded on the storage system, decrypting, by the storage system, the encrypted DEK using the KEK, decrypting, by the storage system, the encrypted volume data using the DEK, performing, by the storage system, one or more data reduction operations on the decrypted volume data, and having performed the data reduction operations, storing, by the storage system, the volume data on a storage array.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing increased support for deduplication and compression of encrypted storage volumes. The disclosed techniques can include receiving, at a storage system from a storage client, a data encryption key (DEK) associated with encrypted volume data, in which the DEK is wrapped in a key encryption key (KEK). The disclosed techniques can further include receiving, at the storage system from the storage client, a write request specifying the encrypted volume data for storage on a storage array. The disclosed techniques can further include obtaining, by the storage system, the KEK from a key management system (KMS) embedded on the storage system, and unwrapping, by the storage system, the DEK using the KEK. The disclosed techniques can further include decrypting, by an input/output (IO) decryptor hosted by the storage system, the encrypted volume data using the DEK. The disclosed techniques can further include performing, by the storage system, one or more data reduction operations on the decrypted volume data and storing the data-reduced volume data on the storage array.

Figure 1:
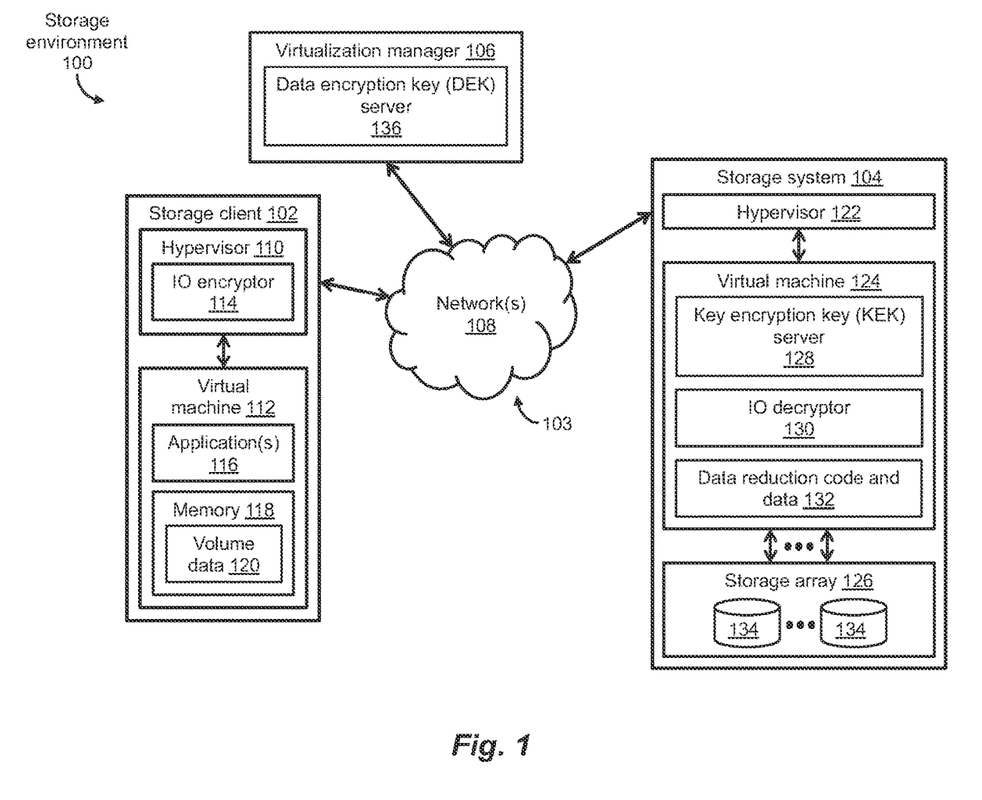
FIG. 1 is a block diagram of a first exemplary storage environment, in which techniques can be practiced for providing increased support for data deduplication and compression of encrypted storage volumes.

FIG. 1 depicts a first illustrative embodiment of a storage environment 100, in which techniques can be practiced for providing increased support for data deduplication and compression of encrypted storage volumes. As shown in FIG. 1, the storage environment 100 can include at least one storage client 102 communicably coupled to a storage system 104 by a communications medium 103, which can include at least one network 108. In the illustrative embodiment of FIG. 1, the storage environment 100 can have a virtualized infrastructure, in which the storage client 102 includes a hypervisor 110 associated with a virtual machine 112, the storage system 104 includes a hypervisor 122 associated with a virtual machine 124, and a virtualization manager 106 manages or controls virtualization resources within the storage environment 100. As employed herein, the term "virtual machine" or "VM" refers to a virtualization of underlying computer hardware and/or software and may include or be associated with various underlying components. As such, the virtual machine 112 of the storage client 102 can be configured to provide functionality of an email server computer, a file server computer, a web server computer, or any other suitable storage client or server. Further, the virtual machine 124 of the storage system 104 can be configured to provide functionality of a standalone storage system, a clustered storage system, a cloud-based storage system, or any other suitable storage system.

In one embodiment, a VMware vSphere® virtualization platform can be used to implement and manage the virtualized infrastructure of the storage environment 100. Further, each of the hypervisors 110 and 122 can be implemented as a VMware ESX® hypervisor or VMware ESXi™ hypervisor, and the virtualization manager 106 can be implemented as a VMware vCenter® server, which can be used in conjunction with the VMware ESX® or ESXi™ hypervisors to install and manage the virtual machines 112, 124, as well as communicate cryptographic or encryption keys to and/or from the storage client 102 and the storage system 104 in a secure fashion. In addition, in one embodiment, the virtualization manager 106 can use vSphere® APIs for Storage Awareness (VASA) to allow the storage system 104 to integrate with the virtualization manager 106. The VMware vSphere® virtualization platform components including the VMware ESX®/ESXi™ hypervisor and the VMware vCenter® server are sold by VMware, Inc., Palo Alto, California, USA.

As shown in FIG. 1, the virtual machine 112 of the storage client 102 can host one or more applications 116 and can include a local memory 118. The virtual machine 112 can execute the application(s) 116 to generate data or metadata ("volume data") 120 in the memory 118, as well as initiate storage input/output (IO) requests (e.g., read requests, write requests) for volume data. In the illustrative embodiment of FIG. 1, such volume data can exist as "data-at-rest" where data or metadata is persistently stored on non-volatile storage media (e.g., magnetic storage media, flash storage media) or "data-in-flight" where the data or metadata is temporarily stored in computer memory and/or transmitted over the network(s) 108. The hypervisor 110 of the storage client 102 can intercept or receive such storage IO requests initiated by the virtual machine 112 and redirect them, e.g., via an application programming interface (API), to the storage system 104. For increased data security, volume data existing as data-at-rest or data-in-flight can be encrypted. Accordingly, the hypervisor 110 can host a data encryptor ("IO encryptor") 114 for use in storing volume data in encrypted form and/or transmitting it over the network(s) 108 in encrypted form.

As further shown in FIG. 1, the virtual machine 124 of the storage system 104 can implement an embedded key management system (KMS) configured to provide functionality of a key encryption key (KEK) server 128, as well as host a data decryptor ("IO decryptor") 130 and execute data reduction code and data 132. As employed herein, the term "key management system" or "KMS" refers to a system for management (e.g., generation, distribution, storage, backup, archive, recovery, use, revocation, destruction) of cryptographic or encryption keys and their associated metadata. In one embodiment, the virtualization resources of the storage environment 100 can include application containers such as Docker containers, Linux containers (LXCs), or any other suitable containers. In a container-based application framework, each application container can incorporate a separate application and associated dependencies and other components, but share kernel functions of an operating system with the other application containers. Further, each application container can be executed as an isolated process in a user space of the operating system. In the storage environment 100, one or more such application containers can be instantiated to provide functionalities of the embedded KMS (e.g., the KEK server 128), the IO decryptor 130, and/or the data reduction code and data 132 within the virtual machine 124.

As described herein, the hypervisor 110 of the storage client 102 can intercept or receive storage IO requests (e.g., read requests, write requests) initiated by the virtual machine 112 and redirect them to the storage system 104. The hypervisor 122 of the storage system 104 can receive such storage IO requests from the hypervisor 110 and provide them to the virtual machine 124. In response to receiving the storage IO requests, the virtual machine 124 can perform storage IO operations (e.g., read operations, write operations) to ultimately cause blocks, pages, files, or any other suitable storage elements specified in the storage IO requests to be read from or written to volumes, virtual volumes, logical units, filesystems, or any other suitable storage objects maintained on one or more storage devices 134 of a storage array 126. As employed herein, the term "virtual volume" refers to a storage object exposed to a storage client by a virtualization layer that can span across more than one site. Because the hypervisor 110 of the storage client 102 can transmit volume data to the storage system 104 in encrypted form, the virtual machine 124 of the storage system 104 can use the IO decryptor 130 to decrypt the volume data, thereby allowing data reduction operations (e.g., data deduplication operations, data compression operations) to be performed on the volume data before it is stored on the storage array 126.

In one embodiment, the virtualization manager 106 can include a KMS configured to provide functionality of a data encryption key (DEK) server 136, which can be used in conjunction with the KEK server 128 of the virtual machine 124 in a process of encrypting or decrypting data-at-rest or data-in-flight within the storage environment 100. In one embodiment, a key management interoperability protocol (KMIP) can be used to communicate with the KEK server 128 and/or the DEK server 136. As employed herein, the term "key management interoperability protocol" or "KMIP" refers to a protocol for providing a syntax to encode messages communicated between a computer or computerized device and a key server. As employed herein, the term "key server" refers to a computer or computerized device for generating, storing, and/or transmitting cryptographic or encryption keys.

Data reduction operations such as data deduplication and data compression can be performed on volume data to reduce the amount of storage space needed to store the volume data on non-volatile storage media, thereby reducing the cost per unit of storage, e.g., the dollar ($) cost per gigabyte (GB) unit of storage. As employed herein, the term "data deduplication" refers to a process of removing redundant or duplicate portions of volume data such that a single instance of a data portion (e.g., a block, a chunk) is stored on physical storage and a pointer or reference is used to access the single stored instance. Any suitable data deduplication process can be used in accordance with the techniques and/or methods disclosed herein. In one embodiment, a data deduplication process can include computing a digest (or hash value) of a block or chunk using an algorithm based on a secure hash algorithm (SHA) family of hashing algorithms. As employed herein, the term "data compression" refers to a process of expressing information with a reduced number of bits based on a specific coding mechanism. Any suitable data compression process can be used in accordance with the techniques and/or methods disclosed herein. Such a data compression process can be used to reduce the amount of data or metadata required to process, store, and/or transmit a given amount of information.

The communications medium 103 can be configured to interconnect the storage client 102, the storage system 104, and the virtualization manager 106 to enable them to communicate and exchange data and/or control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof.

As such, the communications medium 103 can include copper-based data communications devices and cabling, fiber optic devices and cabling, wireless devices, or any suitable combination thereof.

During operation, data or metadata (e.g., volume data) encrypted at the storage client 102 can be decrypted at the storage system 104 to allow data reduction operations (e.g., data deduplication operations, data compression operations), among others, to be performed on the volume data. To that end, the hypervisor 122 of the storage system 104 can receive, over the network(s) 108, an encrypted data encryption key (DEK) associated with the encrypted volume data, as well as a write request specifying the encrypted volume data for storage on the storage array 126. The hypervisor 122 can provide the encrypted DEK and the write request to the virtual machine 124, which can obtain a key encryption key (KEK) associated with the encrypted DEK from the KMS (e.g., the KEK server 128) embedded on the virtual machine 124. Having obtained the KEK from the KEK server 128, the virtual machine 124 can decrypt the encrypted DEK using the KEK, and execute the IO decryptor 130 to decrypt the encrypted volume data using the DEK. Having decrypted the volume data, the virtual machine 124 can execute the data reduction code and data 132 to perform one or more data reduction operations (e.g., data deduplication operations, data compression operations) on the volume data and store the data-reduced volume data on the storage array 126.

The disclosed techniques for providing increased support for deduplication and compression of encrypted storage volumes will be further understood with reference to the following first illustrative example and FIG. 1. In this first example, it is assumed that the storage client 102 is configured to transmit data or metadata (e.g., volume data) over the network(s) 108 in encrypted form for storage on the storage array 126, and that the storage system 104 is configured to decrypt the volume data to allow data reduction operations (e.g., data deduplication operations, data compression operations) to be performed on the volume data before it is stored on the storage array 126.

To that end, the hypervisor 110 of the storage client 102 transmits, over the network(s) 108, a request for a data encryption key (DEK) to the virtualization manager 106. In response to the request for a DEK, the virtualization manager 106 transmits, over the network(s) 108, a request for a key encryption key (KEK) to the hypervisor 122 of the storage system 104. In this first example, the request for a KEK includes an identifier (ID) for the KEK. In response to the request for a KEK, the hypervisor 122 obtains the KEK corresponding to the ID from the embedded KMS (e.g., the KEK server 128) and provides the KEK to the virtualization manager 106, which shares the KEK (the "shared secret") with the hypervisor 110 of the storage client 102. Further, the virtualization manager 106 obtains a DEK from the DEK server 136, wraps the DEK in the shared secret, and transmits the DEK wrapped in the shared secret over the network(s) 108 to the storage client 102. As described herein, in one embodiment, the virtualization manager 106 can be implemented as a VMware vCenter® server, which can be used to communicate cryptographic or encryption keys (e.g., DEKs, KEKs) to and/or from the storage client 102 and the storage system 104 in a secure fashion. In one embodiment, communication between the virtualization manager 106 and the storage system 104 can be performed using the VASA protocol.

In this first example, it is further assumed that a volume (e.g., a virtual volume) containing the volume data to be stored on the storage array 126 is mounted on the storage client 102. In response to mounting the volume, the hypervisor 110 of the storage client 102 transmits the DEK wrapped in the shared secret (e.g., the KEK) over the network(s) 108 to the hypervisor 122 of the storage system 104. In addition, the virtual machine 112 of the storage client 102 initiates a write request specifying the volume data to be stored on the storage array 126. The hypervisor 110 intercepts or receives the write request initiated by the virtual machine 112, unwraps the DEK using the shared secret, and executes the IO encryptor 114 to encrypt the volume data specified in the write request using the DEK. Further, the hypervisor 110 transmits the write request specifying the encrypted volume data over the network(s) 108 to the hypervisor 122 of the storage system 104. Having received the write request, the hypervisor 122 provides it to the virtual machine 124, which unwraps the DEK using the KEK obtained from the embedded KMS (e.g., the KEK server 128) and executes the IO decryptor 130 to decrypt the volume data using the DEK. Once the volume data is decrypted, the virtual machine 124 executes the data reduction code and data 132 to perform one or more data reduction operations (e.g., data deduplication operations, data compression operations) on the volume data and stores the data-reduced volume data on one or more of the storage devices 134 of the storage array 126.

Figure 2:
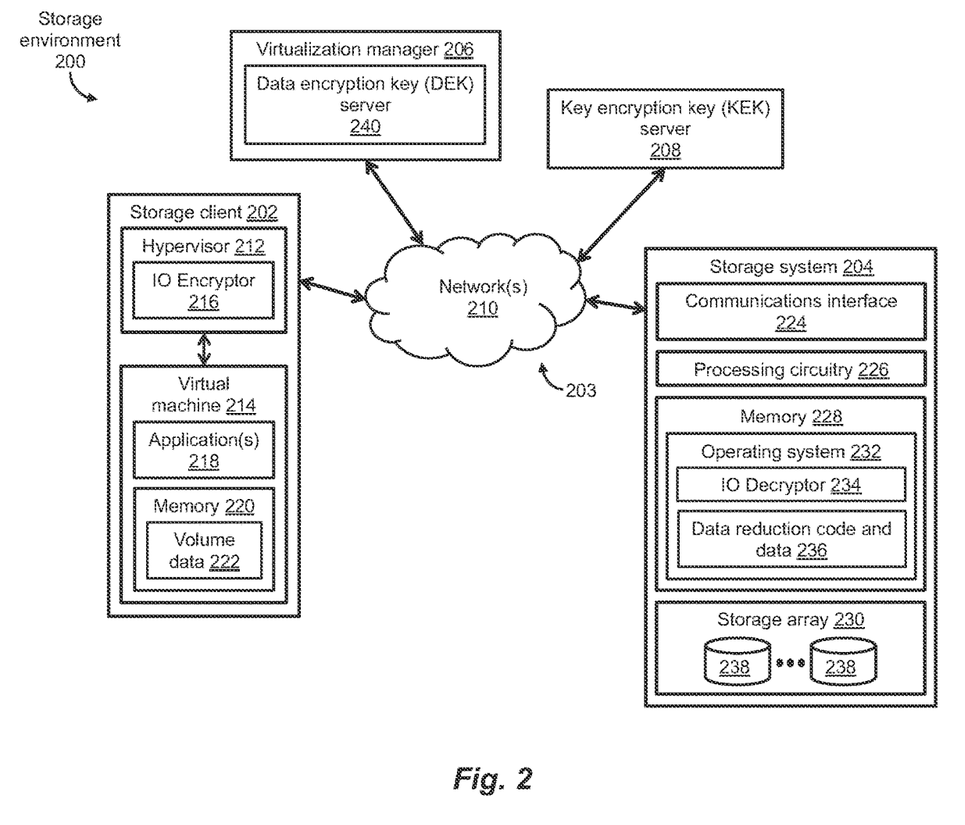
FIG. 2 is a block diagram of a second exemplary storage environment, in which techniques can be practiced for providing increased support for data deduplication and compression of encrypted storage volumes.

FIG. 2 depicts a second illustrative embodiment of a storage environment 200, in which techniques can be practiced for providing increased support for data deduplication and compression of encrypted storage volumes. As shown in FIG. 2, the storage environment 200 can include at least one storage client 202 communicably coupled to a storage system 204 by a communications medium 203, which can include at least one network 210. The storage environment 200 can further include an external key management system (KMS), which can be located remotely or independently from the storage system 204 and can be configured to provide functionality of a key encryption key (KEK) server 208. In the illustrative embodiment of FIG. 2, a portion of the storage environment 200 can include a virtualized infrastructure, in which the storage client 202 includes a hypervisor 212 associated with a virtual machine 214, and a virtualization manager 206 manages or controls virtualization resources within the storage environment 200. The virtualization manager 206 can include a KMS configured to provide functionality of a data encryption key (DEK) server 240. Like the virtual machine 112 of the storage client 102 of FIG. 1, the virtual machine 214 of the storage client 202 of FIG. 2 can be configured to provide functionality of an email server computer, a file server computer, a web server computer, or any other suitable storage client or server. It is noted that the DEK server 240 of the virtualization manager 206 can be used in conjunction with the KEK server 208 in a process of encrypting or decrypting data-at-rest or data-in-flight within the storage environment 200. In one embodiment, the KMIP can be used to communicate with the KEK server 208 and/or the DEK server 240.

Like the storage environment 100 of FIG. 1, in one embodiment, a VMware vSphere® virtualization platform can be used to implement and manage the virtualized infrastructure of the storage environment 200 of FIG. 2. Further, the hypervisor 212 of the storage client 202 can be implemented as a VMware ESX® hypervisor or VMware ESXi™ hypervisor, and the virtualization manager 206 can be implemented as a VMware vCenter® server, which can be used in conjunction with the VMware ESX® or ESXi™ hypervisor to install and manage the virtual machine 214, as well as communicate cryptographic or encryption keys to and/or from the storage client 202, the storage system 204, and the external KMS (e.g., the KEK server 208) in a secure fashion. In addition, in one embodiment, the virtualization manager 206 can use VASA to allow the storage system 204 to integrate with the virtualization manager 206.

The communications medium 203 of FIG. 2 can be configured to interconnect the storage client 202, the storage system 204, the virtualization manager 206, and the external KMS (e.g., the KEK server 208) to enable them to communicate and exchange data and/or control signaling. Like the communications medium 103 of FIG. 1, the communications medium 203 of FIG. 2 can be illustrated as a "cloud" to represent different network topologies such as a SAN topology, a NAS topology, a DAS topology, a LAN topology, a MAN topology, a WAN topology, or any suitable combination thereof. As such, the communications medium 203 can include copper-based data communications devices and cabling, fiber optic devices and cabling, wireless devices, or any suitable combination thereof.

As shown in FIG. 2, the virtual machine 214 of the storage client 202 can host one or more applications 218 and can include a local memory 220. Further, the virtual machine 214 can execute the application(s) 218 to generate data or metadata ("volume data") 222 in the memory 220, as well as initiate storage IO requests (e.g., read requests, write requests) for volume data. In the illustrative embodiment of FIG. 2, the volume data 222 can exist as "data-at-rest" where the data or metadata is persistently stored non-volatile storage media (e.g., magnetic storage media, flash storage media) or "data-in-flight" where the data or metadata is temporarily stored in computer memory and/or transmitted over the network(s) 210 to the storage system 204. The hypervisor 212 of the storage client 202 can intercept or receive such storage IO requests from the virtual machine 214 and redirect them, e.g., via an API, to the storage system 204. For increased data security, volume data existing as data-at-rest or data-in-flight can be encrypted. Accordingly, the hypervisor 212 can host a data encryptor ("IO encryptor") 216 for use in storing volume data in encrypted form and/or transmitting it over the network(s) 210 in encrypted form.

As further shown in FIG. 2, the storage system 204 can include a communications interface 224, processing circuitry 226, a memory 228, and a storage array 230. The communications interface 224 can include an Ethernet interface, an InfiniBand interface, a Fiber Channel interface, or any other suitable communications interface. The communications interface 224 can further include SCSI target adapters, network interface adapters, or any other suitable adapters for converting electronic, optical, and/or wireless signals received over the network(s) 210 to a form suitable for use by the processing circuitry 226.

The processing circuitry 226 can be configured to process storage IO requests (e.g., read requests, write requests) issued by the storage client 202 and store data or metadata (e.g., volume data) in a redundant array of independent disk (RAID) environment implemented on the storage array 230, which can include one or more storage devices 238 such as solid-state drives (SSDs), hard disk drives (HDDs), optical drives, flash drives, hybrid drives, and/or any other suitable storage drive(s) or device(s). The storage devices 238 can be configured to store volumes, virtual volumes, logical units, filesystems, and/or any other suitable storage objects for hosting data or metadata storage of the application(s) 218 (e.g., email client applications, file client applications, web client applications) running on the storage client 202.

The memory 228 can include persistent memory (e.g., flash memory, magnetic memory) and non-persistent memory (e.g., dynamic random-access memory (DRAM), static random-access memory (SRAM)), as well as an operating system (OS) 232 such as a Linux OS, Unix OS, Windows OS, or any other suitable operating system. The memory 228 can further include a variety of software constructs realized in the form of specialized code and data such as an IO decryptor 234 and data reduction code and data 236. The storage system 104 can be configured as a standalone storage system including a single storage appliance, a clustered storage system including two or more storage appliances, one of multiple cloud-based storage systems in a cloud infrastructure, or any other suitable storage appliance or system.

In the context of the processing circuitry 226 being configured to execute specialized code and data ("program instructions") out of the memory 228, a computer program product can be configured to deliver all or a portion of the program instructions and/or data to the processing circuitry 226. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 226, the various techniques and/or methods disclosed herein.

The disclosed techniques for providing increased support for deduplication and compression of encrypted storage volumes will be further understood with reference to the following second illustrative example and FIG. 2. In this second example, it is assumed that the storage client 202 is configured to transmit data or metadata (e.g., volume data) over the network(s) 210 in encrypted form for storage on the storage array 230, and that the storage system 204 is configured to decrypt the volume data to allow data reduction operations (e.g., data deduplication operations, data compression operations) to be performed on the volume data before it is stored on the storage array 230.

To that end, the hypervisor 212 of the storage client 202 transmits, over the network(s) 210, a request for a data encryption key (DEK) to the virtualization manager 206. In response to the request for a DEK, the virtualization manager 206 transmits, over the network(s) 210, a request for a key encryption key (KEK) to the external KMS (e.g., the KEK server 208). As in the first example, the request for a KEK includes an identifier (ID) for the KEK. In response to the request for a KEK, the KEK server 208 obtains the KEK corresponding to the ID and provides the KEK to the virtualization manager 206, which shares the KEK (the "shared secret") with the hypervisor 212 of the storage client 202 and the storage system 204. Further, the virtualization manager 206 obtains a DEK from the DEK server 240, wraps the DEK in the shared secret, and transmits the DEK wrapped in the shared secret over the network(s) 210 to the storage client 202. As in the first example, in one embodiment, the virtualization manager 206 can be implemented as a VMware vCenter® server, which can be used to communicate cryptographic or encryption keys (e.g., DEKs, KEKs) to and/or from the storage client 202, the storage system 204, and the KEK server 208 in a secure fashion. In one embodiment, communication between the virtualization manager 206 and the storage system 204 can be performed using the VASA protocol.

In this second example, it is further assumed that a volume (e.g., a virtual volume) containing the volume data to be stored on the storage array 230 is mounted on the storage client 202. In response to mounting the volume, the hypervisor 212 of the storage client 202 transmits the DEK wrapped in the shared secret (e.g., the KEK) over the network(s) 210 to the storage system 204. In addition, the virtual machine 214 of the storage client 202 initiates a write request specifying the volume data to be stored on the storage array 230. The hypervisor 212 intercepts or receives the write request initiated by the virtual machine 214, unwraps the DEK using the shared secret, and executes the IO encryptor 216 to encrypt the volume data specified in the write request using the DEK. Further, the hypervisor 202 transmits the write request specifying the encrypted volume data over the network(s) 210 to the storage system 204. Having received the write request, the processing circuitry 226 of the storage system 204 unwraps the DEK using the shared secret received from the virtualization manager 206 and executes the IO decryptor 234 to decrypt the volume data using the DEK. Once the volume data is decrypted, the processing circuitry 226 executes the data reduction code and data 236 to perform one or more data reduction operations (e.g., data deduplication operations, data compression operations) on the volume data and stores the data-reduced volume data on one or more of the storage devices 238 of the storage array 230.

Figure 3:
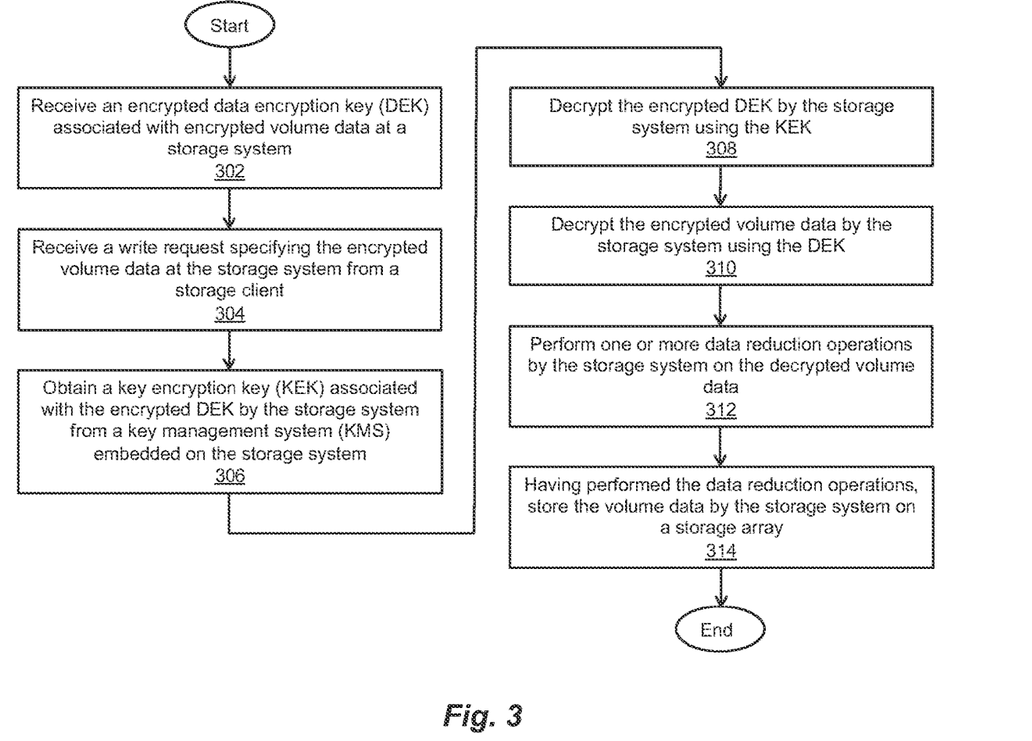
FIG. 3 is a flow diagram of an exemplary method of providing increased support for data deduplication and compression of encrypted storage volumes.

A method of providing increased support for deduplication and compression of encrypted storage volumes is described below with reference to FIG. 3. As depicted in block 302, an encrypted data encryption key (DEK) associated with encrypted volume data is received at a storage system. As depicted in block 304, a write request specifying the encrypted volume data is received at the storage system from a storage client. As depicted in block 306, a key encryption key (KEK) associated with the encrypted DEK is obtained by the storage system from a key management system (KMS) embedded on the storage system. As depicted in block 308, the encrypted DEK is decrypted by the storage system using the KEK. As depicted in block 310, the encrypted volume data is decrypted by the storage system using the DEK. As depicted in block 312, one or more data reduction operations are performed by the storage system on the decrypted volume data. As depicted in block 314, having performed the data reduction operations, the volume data is stored by the storage system on a storage array.

Having described the above illustrative embodiments, various alternative embodiments and/or variations may be made and/or practiced. For example, with reference to FIG. 1, it was described herein that the storage client 102 can include a hypervisor 110 associated with a virtual machine 112, and that the storage system 104 can include a hypervisor 122 associated with a virtual machine 124. In an alternative embodiment, the same single hypervisor can be associated with both the virtual machine (VM) of the storage client ("client VM") and the virtual machine (VM) of the storage system ("storage VM"). Further, the single hypervisor can be configured to detect that the client VM and the storage VM share the same virtual resources of the hypervisor, allowing the hypervisor and the storage VM to communicate with one another over a secure communication channel. In response to the detection, the hypervisor can avoid encrypting volume data to be transmitted over the secure communication channel to the storage VM, thereby improving storage performance.

It was further described herein with reference to FIG. 1 that once the virtual machine 124 of the storage system 104 has decrypted volume data using a data encryption key (DEK), it can execute the data reduction code and data 132 to perform data reduction operations (e.g., data deduplication operations, data compression operations) on the volume data and store the data-reduced volume data on the storage device(s) 134 of the storage array 126. In an alternative embodiment, having performed the data reduction operations on the volume data, the virtual machine 124 can encrypt the data-reduced volume data before storing it on the storage array 126, using the same DEK or a different DEK.

It was further described herein that volume data can exist as "data-in-flight" where data or metadata is temporarily stored in computer memory and/or transmitted over a network for non-volatile storage at a storage system. In one embodiment, the storage client 102 of FIG. 1 (or the storage client 202 of FIG. 2) can perform a rekeying operation to change a data encryption key (DEK) used to encrypt its volume data-in-flight. In prior approaches, a storage client typically reads all of its encrypted volume data from non-volatile storage of a storage system, decrypts the volume data using an original DEK, re-encrypts the volume data using a new DEK, and writes the re-encrypted volume data back to non-volatile storage of the storage system, which can be a costly process in terms of processing and/or memory resources. In an alternative embodiment, a storage client can obtain a new DEK from a virtualization manager, in the manner as described above with reference to the first illustrative example (or the second illustrative example). Further, having obtained the new DEK, the storage client can transmit the new DEK wrapped in a shared secret to a storage system, and direct the storage system to use the new DEK to encrypt or decrypt volume data-in-flight, as appropriate, when servicing any future read requests or write requests from the storage client.

For example, regarding servicing a read request from the storage client, the storage system may reconstruct original data (e.g., volume data) specified in the read request from data-reduced volume data (e.g., deduplicated and compressed data or compressed and deduplicated data) stored on a storage array. To that end, the storage system can (i) read the data-reduced volume data from the storage array, (ii) if the data-reduced volume data were stored on the storage array in encrypted form, decrypt the data-reduced volume data using a suitable DEK, and (iii) decompress and duplicate the volume data (or duplicate and decompress the volume data) to reconstruct the original data. Having reconstructed the original data, the storage system can unwrap the new DEK received from the storage client using the shared secret, encrypt the reconstructed original data using the new DEK, and transmit the encrypted original data as data-in-flight to the storage client.

It is noted that, in the storage environment 100 of FIG. 1 (or the storage environment 200 of FIG. 2), a volume can exist as a logical unit number (LUN) of a virtual machine file system (VMFS). As employed herein, the term "logical unit number" or "LUN" refers to a logical entity for accessing data or metadata from a storage system and can be used interchangeably with the terms "logical unit" (LU) or "logical volume." In one embodiment, the VMFS can be embodied as a VMware® VMFS of the type utilized in VMware® ESX/ESXi server software to store files in a virtualized environment. In prior approaches, a hypervisor associated with a virtual machine can implement a VMFS, which provides the hypervisor with its own VM filesystem. Further, each logical volume that the virtual machine is aware of can correspond to a file in the VM filesystem. When the hypervisor connects to a storage system using its VMFS and the virtual machine initiates a write request to write a block of logical volume data to the storage system, the block is encrypted and written to a file of the VM filesystem. In one embodiment, the block of logical volume data can be encrypted using an XTS encryption mode, which is described in the Institute for Electrical and Electronic Engineers (IEEE) P1619/D19 Draft Standard for Cryptographic Protection of Data on Block-Oriented Storage Devices (October 2007), IEEE, Piscataway, New Jersey, USA. Using the XTS encryption mode, each encrypted block of logical volume data can have exactly the same size as its decrypted version. Further, offsets of the blocks in the VM filesystem are used as special modifiers that allow each block to be effectively encrypted using a different data encryption key (DEK). Once the encrypted block is written to the file of the VM filesystem, the write request is translated such that the encrypted block is written to a virtual disk of the storage system. When using full disk encryption (FDE) drives, all blocks written to the FDE drives are encrypted and all blocks read from the FDE drives are decrypted. Further, the offset of a block in a volume being written to (or read from) is input (along with the DEK) to an encryption/decryption algorithm. When using VMFS, many individual volumes are encoded as files within a larger VMFS volume, and the offsets of blocks in the individual volumes are input to the encryption/decryption algorithm. In prior approaches, however, just the offset of a block in the larger VMFS volume is transmitted to the storage system with each write request (or read request) from the storage client. In an alternative embodiment, the offset of the block in an individual volume within the larger VMFS volume is transmitted to the storage system as additional data (or metadata) with each write request (or read request) from the storage client. The storage system can then use the block offset information contained in the additional data (or metadata) of the write request (or read request) when decrypting the encrypted block.

It is further noted that, in the storage environment 100 of FIG. 1 (or the storage environment 200 of FIG. 2), the key management system(s), the IO encryptor(s), and/or the IO decryptor(s) can be encapsulated in secure enclaves to prevent cryptographic or encryption keys or other secrets from being visible or accessible to nefarious actors or entities. In one embodiment, Intel® Software Guard Extensions (SGX) technology can be used to provide a secure enclave that prevents an operating system, a hypervisor, and/or an administrator with root privileges from seeing or accessing secrets within the secure enclave. To that end, the secure enclave can remotely attest that it is running on an Intel® chip with particular loaded program code in SGX mode. Once the attestation is made, a secure communication channel can be established with the secure enclave using a protocol such as the Transport Layer Security (TLS) protocol or the Internet Protocol Security (IPSec) protocol. The secure enclave can then be safely provided with cryptographic or encryption keys or other secrets over the secure communication channel. The secure enclave can effectively store any cryptographic or encryption keys or other secrets in protected storage so that they are not visible or accessible to the operating system, the hypervisor, or the administrator with root privileges. In another embodiment, AMD Secure Encrypted Virtualization (SEV) technology can be used to provide a secure enclave for encapsulating the key management system(s) (KMS(s)), the IO encryptor(s), and/or the IO decryptor(s) described herein.

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely, e.g., via a storage attached network (SAN). A storage array (storage drive array, storage disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing increased support for deduplication and compression of encrypted storage volumes, comprising:
   receiving, at a computerized virtualization manager, a request for a data encryption key (DEK) from a storage client;
   in response to the request for the DEK:
      obtaining, by the computerized virtualization manager, the DEK;
      obtaining, by the computerized virtualization manager, a key encryption key (KEK);
      encrypting, by the computerized virtualization manager, the DEK using the KEK;
      transmitting, by the computerized virtualization manager, the encrypted DEK to the storage client; and
      sharing, by the computerized virtualization manager, the KEK with the storage client;
   receiving, at a storage system communicably coupled to the computerized virtualization manager, the encrypted DEK from the storage client, the encrypted DEK being associated with encrypted volume data; and
   in response to a write request specifying the encrypted volume data from the storage client,
      obtaining, by the storage system, the KEK associated with the encrypted DEK;
      decrypting, by the storage system, the encrypted DEK using the KEK;
      decrypting, by the storage system, the encrypted volume data using the DEK;
      performing, by the storage system, one or more data reduction operations on the decrypted volume data; and
      having performed the data reduction operations, storing, by the storage system, the volume data on a storage array.

2. The method of claim 1 further comprising:
   in response to a read request specifying the volume data from the storage client, reading, by the storage system, the volume data from the storage array;
   reconstructing, by the storage system, the volume data;
   encrypting, by the storage system, the volume data using the DEK; and
   transmitting, by the storage system, the encrypted volume data to the storage client.

3. The method of claim 1 wherein receiving the encrypted DEK associated with the encrypted volume data includes receiving the DEK in response to a volume being mounted at the storage client.

4. The method of claim 1 further comprising:
   receiving, at the storage system from the storage client, a second (DEK) different from the received DEK associated with the encrypted volume data; and
   receiving, at the storage system from the storage client, a directive to encrypt or decrypt volume data-in-flight, as appropriate, using the second DEK when servicing any future read requests or write requests from the storage client.

5. The method of claim 4 further comprising:
   in response to a read request specifying the volume data from the storage client, reading, by the storage system, the volume data from the storage array;
   reconstructing, by the storage system, the volume data;
   encrypting, by the storage system, the volume data using the second DEK; and
   transmitting, by the storage system, the encrypted volume data to the storage client.

6. The method of claim 1 wherein obtaining, by the computerized virtualization manager, the KEK comprises:
   transmitting, by the computerized virtualization manager, a request for the KEK to the storage system; and
   receiving, by the computerized virtualization manager, the KEK from a key management system (KMS) embedded on the storage system.

7. The method of claim 6 wherein the request for the KEK includes an identifier (ID) for the KEK, and wherein obtaining, by the storage system, the KEK associated with the encrypted DEK includes obtaining the KEK corresponding to the ID from the KMS embedded on the storage system.

8. The method of claim 1 wherein obtaining, by the computerized virtualization manager, the KEK includes obtaining the KEK from a key management system (KMS) external to the storage system.

9. The method of claim 8 comprising:
   in response to the request for the DEK, sharing, by the computerized virtualization manager, the KEK with the storage system.

10. A system for providing increased support for deduplication and compression of encrypted storage volumes, comprising:
    a computerized virtualization manager configured to:
       receive a request for a data encryption key (DEK) from a storage client;
       in response to the request for the DEK:
          obtain the DEK;
          obtain a key encryption key (KEK);
          encrypt the DEK using the KEK;

transmit the encrypted DEK to the storage client; and
share the KEK with the storage client; and
a storage system communicably coupled to the computerized virtualization manager and configured to:
receive the encrypted DEK from the storage client, the encrypted DEK being associated with encrypted volume data; and
in response to a write request specifying the encrypted volume data from the storage client:
obtain the KEK associated with the encrypted DEK;
decrypt the encrypted DEK using the KEK;
decrypt the encrypted volume data using the DEK;
perform one or more data reduction operations on the decrypted volume data; and
having performed the data reduction operations, store the volume data on a storage array.

11. The system of claim 10 wherein the storage system is further configured to receive the encrypted DEK in response to a volume being mounted at the storage client.

12. The system of claim 10 wherein the computerized virtualization manager is further configured to to obtain the KEK from a key management system (KMS) external to the storage system.

13. The system of claim 10 wherein the storage client includes a hypervisor associated with a virtual machine, and wherein the hypervisor includes a virtual machine file system (VMFS).

14. The system of claim 13 wherein a plurality of individual volumes are encoded as files within a VMFS volume of the VMFS, wherein the volume data corresponds to a data block having an offset in an individual volume from among the plurality of individual volumes, and wherein the write request specifying the encrypted volume data includes metadata containing the offset of the data block in the individual volume.

15. The system of claim 14 wherein the storage system is further configured to decrypt the encrypted volume data using the DEK and the offset of the data block in the individual volume.

16. The system of claim 10 further comprising:
a key decryptor configured to decrypt the encrypted DEK using the KEK; and
a data decryptor configured to decrypt the encrypted volume data using the DEK,
wherein at least one of the key decryptor, the data decryptor, and the KMS is encapsulated in a secure enclave.

17. A computer program product including a set of non-transitory, computer-readable media having instructions that, when executed by processing circuitry, cause the processing circuitry to perform a method comprising:
receiving, at a computerized virtualization manager, a request for a data encryption key (DEK) from a storage client;
in response to the request for the DEK:
obtaining, by the computerized virtualization manager, the DEK;
obtaining, by the computerized virtualization manager, a key encryption key (KEK);
encrypting, by the computerized virtualization manager, the DEK using the KEK;
transmitting, by the computerized virtualization manager, the encrypted DEK to the storage client; and
sharing, by the computerized virtualization manager, the KEK with the storage client;
receiving, at a storage system communicably coupled to the computerized virtualization manager, the encrypted DEK from the storage client, the encrypted DEK being associated with encrypted volume data; and
in response to a write request specifying the encrypted volume data from the storage client:
obtaining, by the storage system, the KEK associated with the encrypted DEK;
decrypting, by the storage system, the encrypted DEK using the KEK;
decrypting, by the storage system, the encrypted volume data using the DEK;
performing, by the storage system, one or more data reduction operations on the decrypted volume data; and
having performed the data reduction operations, storing, by the storage system, the volume data on a storage array.

18. The computer program product of claim 17 wherein the method further comprises:
receiving the DEK in response to a volume being mounted at the storage client.

19. The computer program product of claim 17 wherein the method further comprises:
receiving, at the storage system from the storage client, a second (DEK) different from the received DEK associated with the encrypted volume data; and
receiving, at the storage system from the storage client, a directive to encrypt or decrypt volume data-in-flight, as appropriate, when servicing any future read requests or write requests from the storage client.

* * * * *